United States Patent [19]

Nakajima et al.

[11] Patent Number: 5,114,207
[45] Date of Patent: May 19, 1992

[54] BODY FOR BATTERY-POWERED INDUSTRIAL VEHICLE

[75] Inventors: Hidemi Nakajima, Tokorozawa; Toshio Nagano, Tokyo, both of Japan

[73] Assignee: Nissan Motor Co., Ltd., Japan

[21] Appl. No.: 540,388

[22] Filed: Jun. 19, 1990

Related U.S. Application Data

[63] Continuation of Ser. No. 288,174, Dec. 22, 1988, abandoned.

[30] Foreign Application Priority Data

Dec. 25, 1987 [JP] Japan .................................. 62-331275

[51] Int. Cl.⁵ .............................................. B60R 27/00
[52] U.S. Cl. ...................................... 296/204; 180/68.5
[58] Field of Search ............... 296/187, 204; 180/68.5, 180/908

[56] References Cited

U.S. PATENT DOCUMENTS

| | | | |
|---|---|---|---|
| 4,173,264 | 11/1979 | Erker et al. | 180/68.5 |
| 4,342,470 | 8/1982 | Matsuda | 296/204 X |
| 4,811,473 | 3/1989 | Link | 180/68.5 X |

FOREIGN PATENT DOCUMENTS

| | | | |
|---|---|---|---|
| 54-160665 | 5/1979 | Japan . | |
| 160665 | 12/1980 | Japan . | |
| 90272 | 6/1982 | Japan | 296/187 |

Primary Examiner—Margaret A. Focarino
Assistant Examiner—Gary C. Hoge
Attorney, Agent, or Firm—Lowe, Price, LeBlanc & Becker

[57] ABSTRACT

In a vehicle body construction for an industrial vehicle of the kind which is powered by a storage battery, a pair of deck plates are secured to open upper ends of a pair of parallel side frames, the deck pates being in the form of planar single plates which are disposed horizontally. A pair of braces and a steering axle mounting member are secured to the lower surfaces of extensions of the deck plates so as to serve as reinforcements therefor. A pair of front battery unit support plates are respectively disposed on the deck plates and are secured to the rear ends of a pair of drive axle mounting plates which are secured to the front portions of the side members and the deck plates. A rear battery unit support plate extends between the extensions of the deck plates so as to be placed thereon and secured to the same.

4 Claims, 4 Drawing Sheets

BODY FOR BATTERY-POWERED INDUSTRIAL VEHICLE

This application is a continuation of application Ser. No. 07/288,174 filed Dec. 22, 1988, now abandoned.

BACKGROUND OF THE INVENTION

1. Field of the Invention

The present invention relates to industrial vehicles such as forklift trucks and more particularly to a vehicle body construction for an industrical vehicle of the kind which is powered by a storage battery.

2. Description of the Prior Art

An example of a prior art vehicle body construction for an industrial vehicle of the above described kind is shown in FIG. 4. In the figure, a side frame is indicated by 20. Two side frames 20 are arranged so as to be spaced from each other laterally of the vehicle body and interconnected by a center cross member 21. A deck plate 22 is secured to the upper open end of each side frame 20 so as to cooperate with same to form a box-like closed cross section. The deck plate 22 consists of a front deck 23 and rear deck 25 which are independent from each other. The front deck 23 has a rear end portion which is bent upwardly to form a front battery unit support plate 24. A brace 26 is secured to the upper surface laterally outer end portion of each rear deck 25 and has a considerable length so as to extend from the front battery unit support plate 24 to the rear end of the rear deck 25.

A steering axle mounting member 27 is secured to the rear end portion lower surface of each rear deck 25 and the laterally inner wall of each side frame 20. The steered wheels rotate about an axis 101. A rear battery unit support plate 28 is secured to the upper surface of the steering axle mounting member 27 and the rear end of each rear deck 25. A drive axle mounting plate 29 is secured to the front portion of the side frame 20 and the upper surface of the front deck 23. The drive wheels rotate about an axis 102. A wheel housing 30 is secured to the laterally outer surface of the drive axle mounting plate 29. A vehicle body construction similar to the above is disclosed in Japanese Provisional Patent Publication No. 55-160665.

In the prior art vehicle body construction described as above, the deck plate 22 is constituted by the separate front and rear decks 23 and 25 and the brace 26 of a predetermined height is secured to the upper surface lateral end portion of each rear deck 25 and extends between the front deck 23 and the rear end of the rear deck 25 for thereby attaining a predetermined structural strength. Due to this, when a battery unit of a considerable weight is to be installed in a battery compartment, i.e., to be installed on each rear deck 25 at a location between each battery unit front support 24 and the battery unit rear support 28 or to be removed from same, it is necessary to first raise or lift the battery unit higher than the height of the brace 26, thus causing a difficulty in installation or removal of the battery unit.

Further, since the deck plate 22 is formed from separate two parts and the braces 26 of a considerable length are necessitated for strengthening the structure, the number of steps in the manufacturing process and the number of constitutent parts are both increased, resulting in an increased cost.

SUMMARY OF THE INVENTION

The structure according to this invention is effective for solving the above-noted disadvantages and shortcomings inherent in the prior art vehicle body construction.

It is accordingly an object of the present invention to provide an improved vehicle body construction for an industrial vehicle of the kind which is powered by a storage battery, which facilitates installation and removal of a battery unit without the need for lifting the same higher than battery unit supporting deck plates of the vehicle.

It is another object of the present invention to provide an improved vehicle body construction of the above-described character which facilitates installation and removal of the battery unit with ease, i.e., with an improved operational efficiency.

It is a further object of the present invention to provide an improved vehicle body construction of the above-described character which permits safe handling of the battery unit.

It is an even further object of the present invention to provide an improved vehicle body construction of the above-described character which has a predetermined structural strength and rigidity without requiring reinforcements to be installed on lateral and portions of battery supporting deck plates.

In accordance with a preferred embodiment of the present invention, there is provided an improved industrial vehicle body construction which comprises a pair of side frames spaced laterally from each other and having rear cross walls and open upper ends, respectively, a center cross-member interconnecting the side frames, a pair of deck plates respectively secured to the open upper ends of the side members and cooperating with the same to form a closed cross-section, said deck plates have extensions at the rear ends thereof, a pair of drive axle mounting plates secured to front portions of the side frames and the deck plates, a rear cross-member extending between rear cross wall so the side frames and secured to the same, a steering-axle mounting member extending between extensions of the deck plates and secured in a butt joint manner to the rear cross-member and to lower surfaces of the deck plate extensions, a pair of front battery unit supprt plates placed on the front portions of the deck plates and secured in a butt joint manner to rear ends of the drive axle mounting plates, and a rear battery unit support plate extending between the extensions of the deck plates to be placed thereon and secured to the same.

DESCRIPTION OF THE PREFERRED EMBODIMENT

Figure 1:
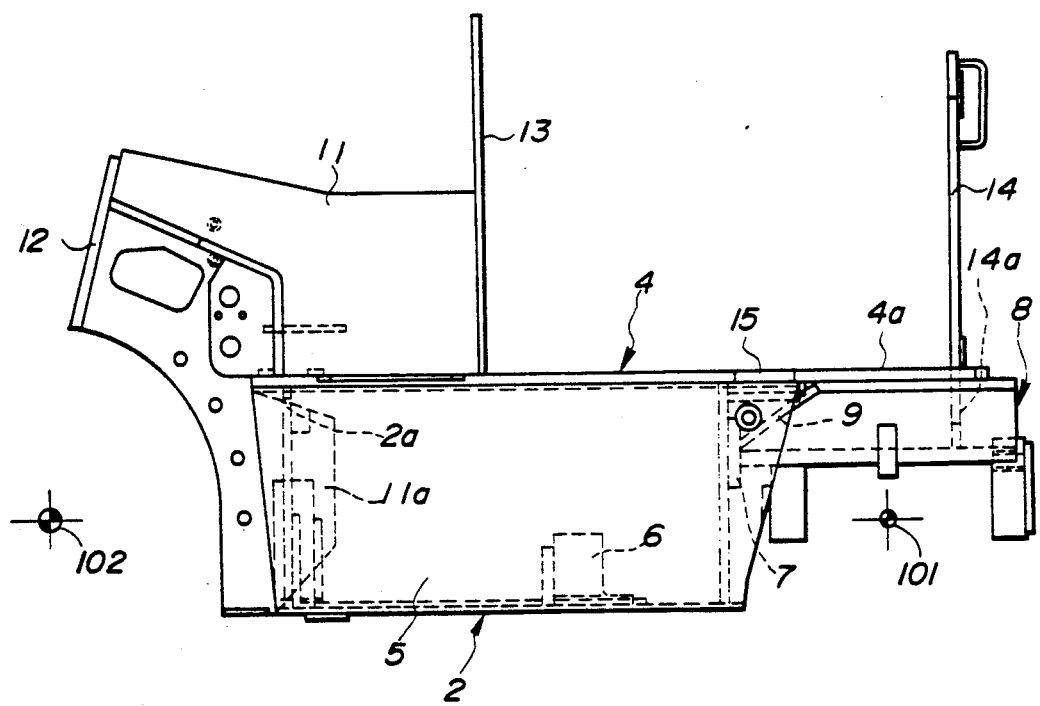
FIG. 1 is a side elevational view of an industrial vehicle body construction according to a preferred embodiment of the present invention.
Figure 2:
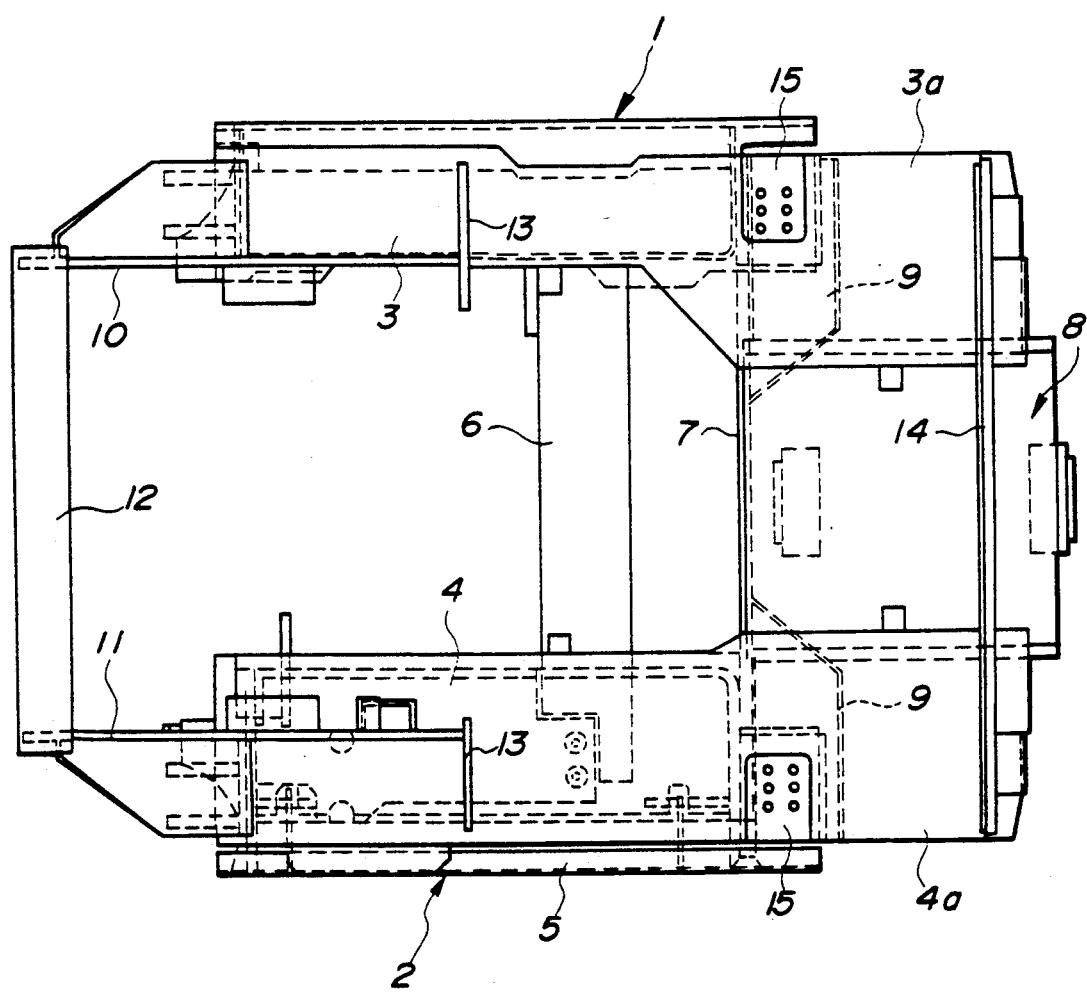
FIG. 2 is a plan view of the embodiment of FIG. 1.
Figure 3:
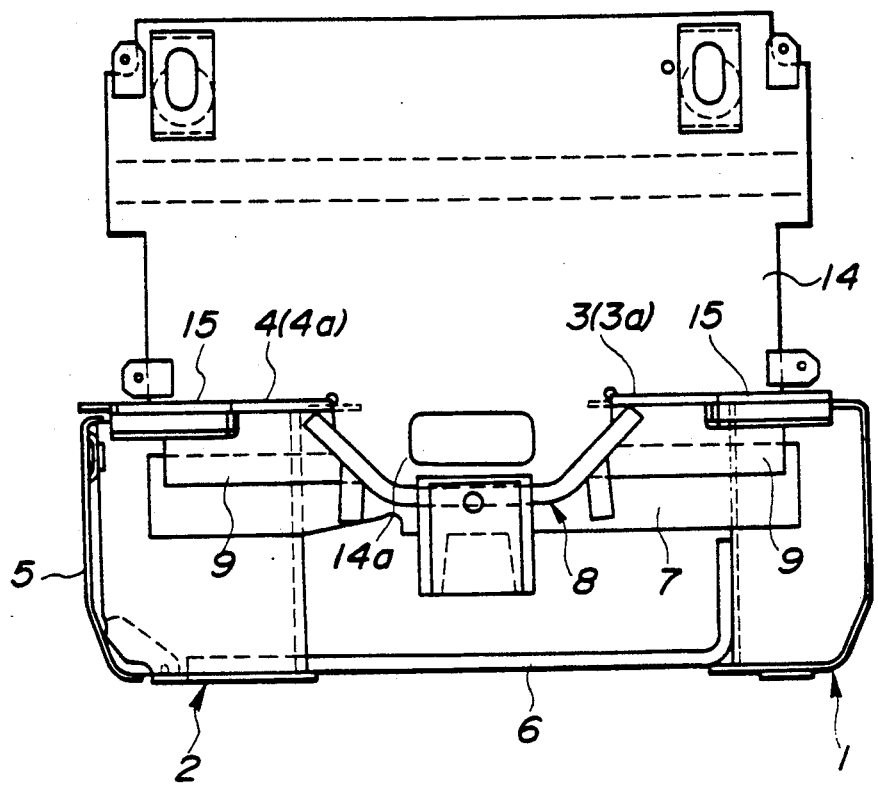
FIG. 3 is a rear elevational view of the embodiment of FIG. 1.

Referring to FIGS. 1 to 3, a pair of side frames are generally indicated by 1 and 2 respectively and arranged so as to be spaced apart from each other parallel to and laterally of a vehicle body. A pair of deck plates 3 and 4 in the form of planar plates are arranged horizontally, and are respectively welded or otherwise secured to upper open ends of the side frames 1 and 2 so as to cooperate with the same to form box-like closed cross-sections. The deck plates 3 and 4 have horizontal extensions 3a and 4a at their respective rear ends. One side frame is formed with a sealingly closed oil tank (not shown) and the other side frame 2, as best seen in FIG. 2, has a wall portion which constitutes a movable lid 5 for a controller unit receiving portion. The side frames 1 and 2 are interconnected at intermediate portions thereof by a cross-member 6 and at rear end portions by a rear cross member 7, to thereby constitute a rigid vehicle body framework.

More specifically, as best seen in FIG. 3, the center cross-member 6 is in the form of an elongated, generally planar plate and is arranged horizontally so as to be secured at one horizontal end 6a to the bottom wall 2b of the side frame 2 and at an upstanding end 6b to the laterally inner wall 1a of the side frame 1. The rear cross-member 7 is in the form of an elongated planar plate and is arranged vertically so as to be secured at opposite vertical ends to rear cross walls 1b and 2c of the side frames 1 and 2.

A steering axle mounting member 8, best seen in FIGS. 2 and 3, has a U-like cross-section and has a horizontal bottom wall 8a and a pair of upstanding walls 8b and 8c which diverge from each other as they extend upwardly and are arranged so as to oppose laterally of the vehicle body. The steering axle mounting member 8 is secured in a butt joint manner at the front end to the rear cross member 7 and at upper ends of the upstanding walls 8b and 8c to the lower surfaces of the extensions 3a and 4a of the deck plates 3 and 4, respectively.

A pair of braces 9 and 9 in the form of an elongated planar plate are arranged so sa to straddle the corners formed by the rear cross member 7 and the respective extensions 3a and 4a and secured at the upper ends to the extensions 3a and 4a and at the lower ends to the rear cross member 7. The braces 9 and 9 are further secured in a butt joint manner at laterally inner ends to the upstanding walls 8b and 8c of the steering axle mounting member 8, thereby to constitute a pair of rigid structural portions having a triangle-like nearly closed cross section and extending laterally of the vehicle body between the respective deck plates 3 and 4 and the steering axle mounting member 8.

A pair of drive axle mounting plates 10 and 11 are provided in the form of planar plates and are arranged vertically, as best seen in FIGS. 1 and 2. The drive-axle mounting plates 10 and 11 are interconnected at their front slanting ends by a front cross-member 12 which is in the form of a flat planar plate and is arranged to slant along the slanting front ends. The drive axle mounting plates 10 and 11 are secured at their rear lower ends to the front portions of the side frames 1 and 2 and the deck plates 3 and 4. More specifically, one drive-axle mounting plate 10 is secured at the rear lower end portion to the laterally inner wall 1a of the side frame 1 and the upper surface of the deck plate 3. The other drive axle mounting plate 11 is secured at the lower end portion to the front end of the side frame 2 and the upper surface of the deck plate 4. Particularly, the drive axle mounting plate 11 has a projection 11a protruding from a rear lower end portion and inserted into a slit 2a formed in a front cross wall 2d of the side member 2 and secured to same, to thereby strength the structure.

Figure 5:
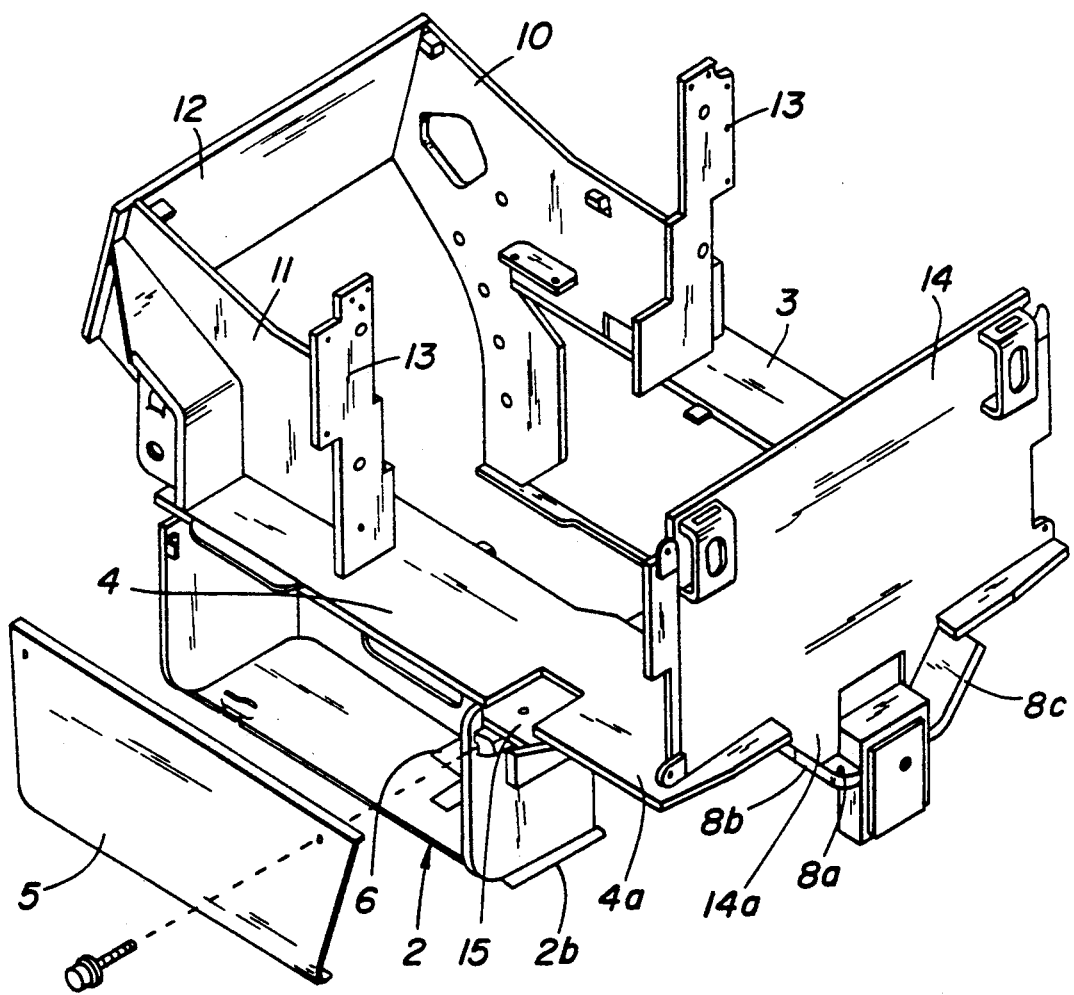
FIG. 5 is a partial exploded perspective view of the industrial body construction per FIGS. 1 and 2.

A pair of front battery unit support plates 13 and 13 and a rear battery unit support plate 14, in the form of planar plates, are arranged so as to extend vertically and laterally, as best seen in FIGS. 1 and 2. The front battery unit support plates 13 and 13 and the rear battery unit support plate 14 are respectively installed on the upper surfaces of the deck plates 3 and 4 each in a vertical plane and are secured to the rear ends of the drive axle mounting plates 10 and 11, respectively. The rear battery unit support plate 14, as best seen in FIG. 1, has at a lower end an integral location projection 14a fittingly engaged with the bottom wall 8a and the upstanding walls 8b and 8c of the steering axle mounting member 8 for locating the rear battery unit suuport plate 14 relative to the steering axle mounting member 8. Indicated by 15 and 15 in FIGS. 1 and 2 are side stopper attaching portions provided to the deck plates 3 and 4. After installation of a storage battery or battery unit (not shown), side stoppers (not shown) are bolted to the side stopper attaching portions 15 and 15 for preventing lateral movement of the battery unit. See also FIG. 5.

From the foregoing, it will be understood that the industial vehicle body construction of this invention makes it possible to install or remove a battery unit of a considerable weight from the lateral ends of the deck plate 3 and 4 with ease or, optionally, to install or remove the battery unit by sliding the same from a platform of a carrier. This structure therefore, makes it possible to perform installation or removal work with an improved efficiency since the deck plates 3 and 4 are constituted by planar single plates and reinforcements such as the braces 9 and 9 are provided for effectively strengthening the structure adjacent the deck plates 3 and 4.

Figure 4:
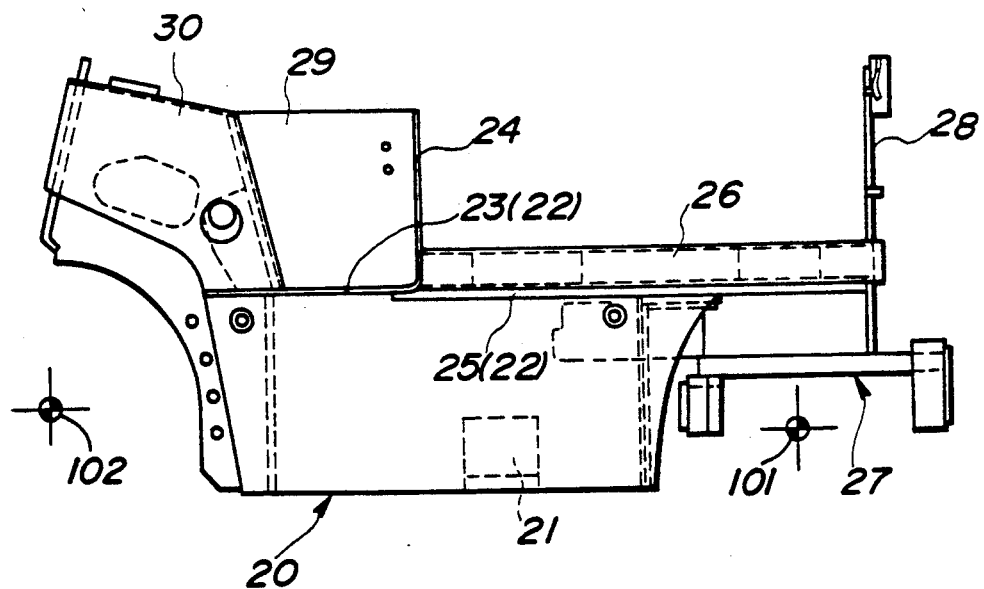
FIG. 4 is a view similar to FIG. 1 of a prior art industrial vehicle body construction.

It will be further understood that the vehicle body construction of this invention can attain a sufficient structural strength or rigidity without requiring lengthy braces 26 as are installed in the lateral ends of the deck plates as used in the prior art construction of FIG. 4 since the steering axle mounting member 8 is arranged so as to extend between the extensions 3a and 4a of the deck plates 3 and 4 and is secured at the front end to the rear cross-member 7 which is in turn rigidly connected at the opposite ends to the side frames 1 and 2. Particularly, in this embodiment the steering axle mounting member 8 is connected at the upstanding walls 8b and 8c with the braces 9 and 9 and cooperates with the braces 9 and 9, the extensions 3a and 4a of the deck plates 3 and 4 and the rear cross-member 7 to form rigid structural portions of a nearly closed triangle-like cross-section, thus making it possible to further increase the structural strength.

It will be further understood that the vehicle body construction of this invention makes it possible to support the longitudinal dynamic load resulting from the inertial mass of the battery unit, directly by the drive axle mounting plates 10 and 11 and the side frames 1 and 2 or by support for the same indirectly by the side frames 1 and 2 by way of the extensions 3a and 4a, steering axle mounting member 8, rear cross member 7 and braces 9 and 9 since the front battery unit support plates 13 and 13 are respectively attached to the rear ends of the drive axle mounting plates 10 and 11 whilst the rear battery unit support plate 14 is arranged so as to extend between the deck plates 2 and 4 secured to same.

In this connection, since the front battery unit support plates 13 and 13 and the rear battery unit support plate 14 are all held fixed on the deck plates 3 and 4, it becomes possible to slide the support plates relative to each other for thereby adjusting their relative locations. Thus for example, it becomes possible to slide the rear battery unit support plate 14 relative to the front battery unit support plate 13 the position of which is regarded as the reference position, and to fix the former in position relative to the latter, thus making it possible to attain accurate installation of the support plates and therefore easily obtain correct or suitable installation of the battery unit.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive, the invention being defined solely by the claims appended hereto.

What is claimed is:

1. An industrial vehicle body construction, comprising:
    a pair of side frames spaced laterally from each other, each side frame having rear cross walls and open upper ends; a center cross member interconnecting said side frames;
    a pair of deck plates respectively secured to said upper open ends of said side members and cooperating with the same to form a closed cross-section, said deck plates each having extensions at the rear ends thereof;
    a pair of drive axle mounting plates secured to front portions of said side frames and said deck plates;
    a rear cross member extending between said rear cross walls of said side frames and secured to the same;
    a steering axle mounting member extending between said extensions of said deck plates and secured in a butt joint manner to rear ends of said deck plates; and
    a rear battery unit support plate extending between said extensions of said deck plates, placed thereon and secured to the same.

2. A vehicle body construction for an industrial vehicle, comprising:
    a pair of longitudinal side frames spaced apart parallel to and laterally from each other, each side frame having rear cross walls and open upper ends;
    a center cross member interconnecting said side frames;
    a pair of deck plates respectively secured to said open upper ends of said side members and cooperating with the same to form a box-like closed cross-section, said deck plates being in the form of planar single plates disposed horizontally and having extensions at the rear ends;
    a pair of drive axle mounting plates, in the form of planar plates disposed vertically and secured to front portions of said side frame and said deck plates;
    a rear cross member in the form of a planar plate disposed vertically and extending between said rear cross walls of said side frames and secured to the same;
    a steering axle mounting member of a U-like cross-section, having a horizontal bottom wall and a pair of upstanding walls which diverge as they extend upwardly, said upstanding walls being arranged to oppose laterally, said steering axle mounting member extending between said extensions of said deck plates and being secured in a butt joint manner at the upper ends of said upstanding walls to the lower surfaces of said extensions, a front end of said steering axle mounting member being further secured in a butt joint manner to said rear cross member;
    a pair of braces in the form of a first planar plate, straddling corners formed by said rear cross member and said respective extensions of said deck plates, said braces being secured at respective upper ends to the lower surfaces of said extensions and at respective lower ends to said rear cross member, said braces being further secured at laterally inner ends to said upstanding walls of said steering axle mounting member;
    a pair of front battery unit support plates in the form of second planar plates disposed vertically, placed on said front portions of said deck plates and secured in a butt joint manner to rear ends of said drive axle mounting plates; and
    a rear battery unit support plate in the form of a third planar plate disposed vertically, extending between said extensions of said deck plates to be placed on and secured to the same.

3. The vehicle body construction according to claim 2, wherein:
    said rear battery unit support plate has at a lower end thereof a projection fittingly engagable with said bottom wall and said upstanding walls of said steering axle mounting member to be thereby disposed to be secured to the same.

4. The vehicle body construction according to claim 3 wherein:
    one of said side frames has a front cross-wall formed with a slit, and one of said drive axle mounting plates has a projection projecting from a rear lower end portion disposed to be inserted into said slit and secured to said front cross wall.

* * * * *